United States Patent
Bouska

(10) Patent No.: US 10,928,532 B2
(45) Date of Patent: Feb. 23, 2021

(54) SEISMIC SURVEY METHOD

(71) Applicant: BP Exploration Operating Company Limited, Middlesex (GB)

(72) Inventor: John Gerard Bouska, Calgary (CA)

(73) Assignee: BP EXPLORATION OPERATING COMPANY LIMITED, Middlesex (GB)

( * ) Notice: Subject to any disclaimer, the term of this patent is extended or adjusted under 35 U.S.C. 154(b) by 481 days.

(21) Appl. No.: 15/558,560

(22) PCT Filed: Mar. 23, 2016

(86) PCT No.: PCT/EP2016/056431
§ 371 (c)(1),
(2) Date: Sep. 14, 2017

(87) PCT Pub. No.: WO2016/151037
PCT Pub. Date: Sep. 29, 2016

(65) Prior Publication Data
US 2018/0203142 A1    Jul. 19, 2018

Related U.S. Application Data

(60) Provisional application No. 62/138,629, filed on Mar. 26, 2015.

(51) Int. Cl.
*G01V 1/26* (2006.01)
*G01V 1/30* (2006.01)

(52) U.S. Cl.
CPC ............... *G01V 1/26* (2013.01); *G01V 1/307* (2013.01); *G01V 2200/12* (2013.01)

(58) Field of Classification Search
CPC ....................................................... G01V 1/26
See application file for complete search history.

(56) References Cited

U.S. PATENT DOCUMENTS 6,002,640 A * 12/1999 Harmon ................. G01V 1/223
367/38
6,400,646 B1 * 6/2002 Shah ....................... E21B 47/16
367/82

(Continued)

OTHER PUBLICATIONS

PCT/EP2016/056431 International Search Report and Written Opinion dated Jun. 29, 2016 (13 p.).

(Continued)

*Primary Examiner* — Raymond L Nimox
(74) *Attorney, Agent, or Firm* — Conley Rose, P.C.

(57) ABSTRACT

A method includes receiving data indicative of outputs of first and second seismic sensors. The outputs include components corresponding to the detection by the first and second seismic sensors of first and second seismic signals. In addition, the method includes identifying, relative to a first clock in the first seismic sensor, a first time associated with a time of arrival of the first seismic signal at the first seismic sensor, and a second time associated with a time of arrival of the second seismic signal at the first seismic sensor. Further, the method includes identifying, relative to a second clock in the second seismic sensor, a third time associated with a time of arrival of the first seismic signal at the second seismic sensor, and a fourth time associated with a time of arrival of the second seismic signal at the second seismic sensor. Still further, the method includes determining an offset of the first clock relative to the second clock using the first, second, third and fourth times.

18 Claims, 9 Drawing Sheets

(56) References Cited

U.S. PATENT DOCUMENTS

| | | | |
|---|---|---|---|
| 6,424,595 B1 | 7/2002 | Chenin | |
| 2004/0105341 A1 | 6/2004 | Chamberlain et al. | |
| 2004/0117118 A1* | 6/2004 | Collins | G01V 1/40 |
| | | | 702/6 |
| 2006/0203614 A1* | 9/2006 | Harmon | G01V 1/42 |
| | | | 367/57 |
| 2007/0153628 A1* | 7/2007 | Mathiszik | G01V 1/36 |
| | | | 367/57 |
| 2008/0137474 A1 | 6/2008 | Dashevskiy et al. | |
| 2010/0284246 A1* | 11/2010 | Keegan | G01V 1/003 |
| | | | 367/14 |
| 2010/0305895 A1* | 12/2010 | Drange | G01V 1/26 |
| | | | 702/79 |
| 2011/0273958 A1* | 11/2011 | Xia | G01V 1/3817 |
| | | | 367/21 |
| 2012/0287753 A1* | 11/2012 | Hatchell | G01V 1/38 |
| | | | 367/21 |
| 2013/0013212 A1* | 1/2013 | Hatchell | G01V 1/38 |
| | | | 702/14 |
| 2015/0003200 A1* | 1/2015 | Hall | G01V 1/003 |
| | | | 367/38 |

OTHER PUBLICATIONS

Russian Office Action dated Jul. 16, 2019, for Russian Application No. 2017134844 (2 p.).

* cited by examiner

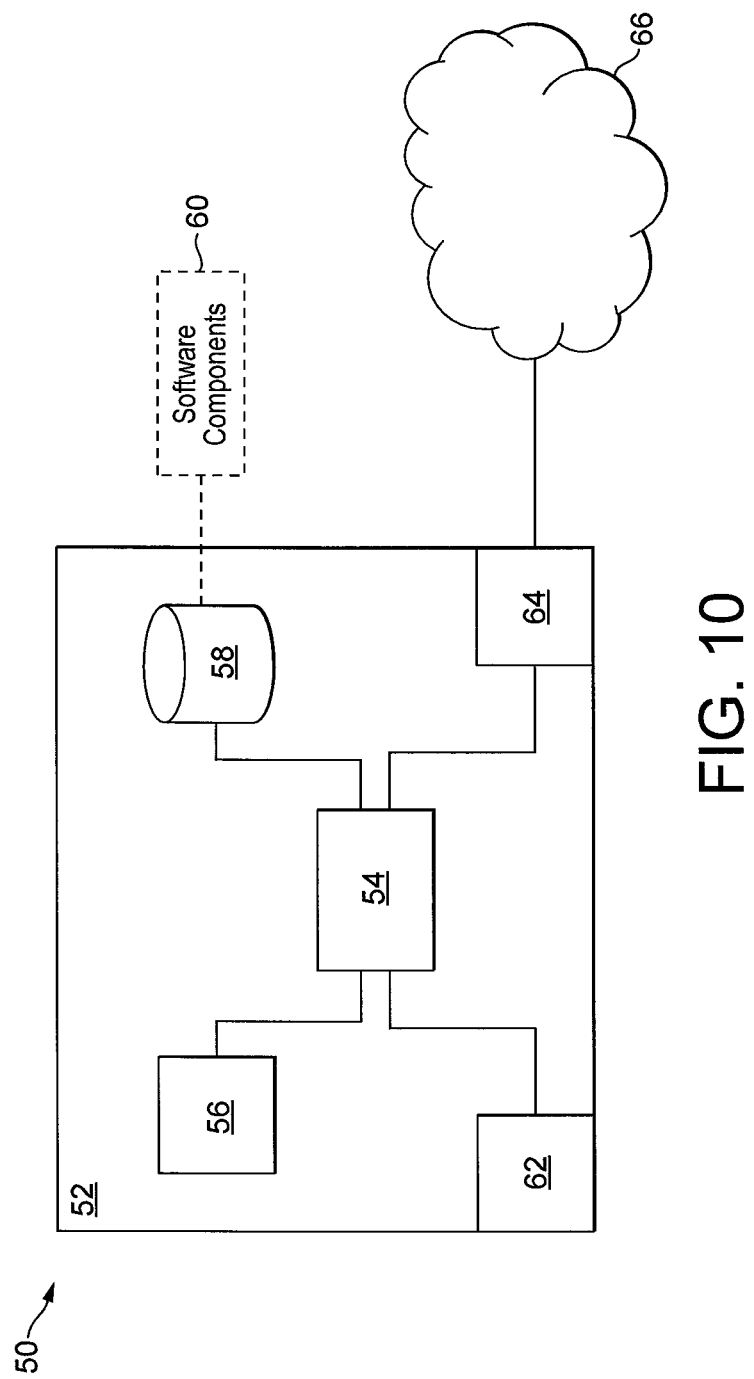

SEISMIC SURVEY METHOD

CROSS-REFERENCE TO RELATED APPLICATIONS

This application is a 35 U.S.C. § 371 national stage application of PCT/EP2016/056431 filed Mar. 23, 2016 and entitled "Seismic Survey Method," which claims priority to U.S. Provisional Application No. 62/138,629 filed Mar. 26, 2015 and entitled "Seismic Survey Method," each of which are hereby incorporated herein by reference in their entirety for all purposes.

STATEMENT REGARDING FEDERALLY SPONSORED RESEARCH OR DEVELOPMENT

Not applicable.

TECHNICAL FIELD

The present invention relates to methods and apparatus for use in seismic surveying, and in particular for correcting drift in clocks in seismic sensors.

BACKGROUND

Seismic surveying, or reflection seismology, is used to map the Earth's subsurface. A controlled seismic source provides low frequency seismic waves which travel through the subsurface of the Earth. At interfaces between dissimilar rock layers, the seismic waves are partially reflected. The reflected waves return to the surface where they are detected by seismic sensors (or seismometers) such as geophones, which are placed on or in the ground surrounding the seismic source. Data recorded by the seismic sensors is analysed to reveal the structure and composition of the subsurface.

FIG. 1 shows a schematic cross section of the surface and subsurface of the earth. Seismic sensors 2 and a seismic source 4 are shown on the surface of the earth 6. A number of layers of differing composition are present within the subsurface. These are illustrated by the interleaved black bands 8 and white bands 10. Seismic waves 12 emitted by the seismic source 4 travel through the subsurface. At the interfaces between the layers 8 and 10, these seismic waves are partially reflected and travel back to the surface to be detected by the seismic sensors 2.

The seismic wave emitted by the seismic source 4 also travels along the surface or along the near surface as a direct wave 12'. Within close proximity from the source, these direct arrivals are detected by each seismic sensor 2 before the respective sensors detect any of the reflected waves. This first arrival is called the "first break".

For a typical seismic survey, a large number of seismic sensors are placed over an area of the surface of the earth above and around the volume of the subsurface to be surveyed. A typical survey may involve tens of thousands of seismic sensors spread over, for example 100 km$^2$. FIG. 2 shows an exemplary arrangement where a plurality of seismic sensors 2 are arranged in a grid pattern. A seismic source 4 is also illustrated surrounded by the seismic sensors 2. Naturally, there will be many more seismic sensors 2 than the twenty shown.

Each seismic sensor has a sensing element capable of detecting the movement of the earth. The sensing element produces an output which reflects the movement of the earth. The output is sampled at regular intervals, for example every millisecond. This sampled data will be referred to as seismic data. The seismic data may be recorded against a sample number or index which increments for each sample. As such, the sample index may be considered a value indicative of time.

The interval between consecutive samples is controlled by a local clock in the seismic sensor. In a typical seismic survey, the nominal (i.e. intended) sampling rate on different sensors participating in the survey is the same (ie. the same number of samples per second). This is not necessarily the case, and where nominal sampling rates differ, the seismic data recorded by one sensor may be re-sampled to enable comparisons between recorded signals.

It is important to accurately know the time that each of these samples was recorded by the seismic sensor relative to a time of emission of the seismic signal by the seismic source. This enables the propagation time of the seismic signal to be calculated. From the propagation time, the depth and position of the interface which reflected the seismic signal can be determined.

Typically, this accuracy is achieved by providing both the seismic source and the seismic sensor with high accuracy clocks. These clocks need to maintain a sufficient accuracy over the duration of the surveying operation, which may last many weeks.

Known ways of ensuring sufficient accuracy for the seismic sensor's clock are to provide the sensor with a clock which can receive radio timing signals, for example GPS timing signals (a GPS synchronised clock). However these solutions add to the cost, size and weight of each seismic sensor.

Clocks that are less accurate generally suffer from drift. Drift means that the clocks do not increment at exactly the same rate. Drift may be caused by both manufacturing differences, and by local factors such as the ambient temperature around the seismic sensor. The magnitude of the drift can vary over time as, for example, the ambient temperature varies. Accordingly, such clocks may drift relative to both an external time signal (i.e. "system time" which may be provided by a high accuracy timing system such as a GPS timing system, as mentioned above) as well as relative to each other.

The consequence of drift is that, while the intended/nominal sampling rates of different sensors are the same, the actual sampling rates can differ by a small amount. This can have deleterious effects when the seismic data is processed and used to produce a seismic image.

It is an object of the present invention to provide methods and systems which enable accurate timings to be determined for seismic surveys, without the requirement for an accurate clock in the seismic sensor itself.

SUMMARY OF THE INVENTION

In accordance with at least one embodiment apparatus and systems are provided for supporting or implementing functionality to perform seismic surveying.

The invention provides a method comprising:

receiving data indicative of outputs of first and second seismic sensors, said outputs including components corresponding to the detection by the first and second seismic sensors of first and second seismic signals, wherein a direction of propagation of the first seismic signal was from the first seismic sensor towards the second seismic sensor, and a direction of propagation of the second seismic signal was from the second seismic sensor towards the first seismic sensor;

identifying, relative to a first clock in the first seismic sensor, a first time associated with a time of arrival of the first seismic signal at the first seismic sensor, and a second time associated with a time of arrival of the second seismic signal at the first seismic sensor;

identifying, relative to a second clock in the second seismic sensor, a third time associated with a time of arrival of the first seismic signal at the second seismic sensor, and a fourth time associated with a time of arrival of the second seismic signal at the second seismic sensor; and determining an offset of the first clock relative to the second clock using the first, second, third and fourth times.

Accordingly, the received data can be processed to identify the offset of the first clock.

When clocks in seismic sensors are not sufficiently accurate, the time of propagation of seismic signals between a seismic source and the seismic sensor is not known. The inventors have realised that by using two seismic signals, the first propagating from the first seismic sensor towards the second seismic sensor, and the second propagating from the second seismic sensor towards the first seismic sensor, it is possible to establish a relationship between the clocks in the seismic sensors.

The method may comprise calculating an average of the first and second times and an average of the third and fourth times, the calculation of the offset being based on a difference between the calculated averages.

The outputs of the first and second seismic sensors may further include components corresponding to the detection by the first and second seismic sensors of third and fourth seismic signals, a direction of propagation of the third seismic signal being from the first seismic sensor towards the second seismic sensor, and a direction of propagation of the fourth seismic signal being from the second seismic sensor towards the first seismic sensor. The method may further comprise:

identifying, relative to the first clock in the first seismic sensor, a fifth time associated with a time of arrival of the third seismic signal at the first seismic sensor, and a sixth time associated with a time of arrival of the fourth seismic signal at the first seismic sensor;

identifying, relative to a second clock in the second seismic sensor, a seventh time associated with a time of arrival of the third seismic signal at the second seismic sensor, and an eighth time associated with a time of arrival of the fourth seismic signal at the second seismic sensor; and determining a scaling factor for the first clock using the first, second, third, fourth, fifth, sixth, seventh and eighth times.

The output of at least one of the first and second seismic sensors may further include a component corresponding to the detection by said at least one seismic sensor, of a repeating seismic signal. In this case, the method can further comprise:

identifying a period of the detected repeating signal in said output; and determining a scaling factor for the clock of said at least one seismic sensor using the identified period. In this example, determining the scaling factor may include comparing the identified period with a known, actual period of an emitted repeating signal. Accordingly, the detected repeated signal results from the emitted repeated signal, for example a signal emitted by a seismic source.

It is seen that, in addition to calculating an offset for a clock, a scaling factor may be determined for the clock of a seismic sensor. The offset and scaling factor can be applied to the time values recorded by the clock of said sensor to map said time values to a system time.

It can be seen that the clock of said one of the seismic sensors can be calibrated relative to a reference clock, using the determined offset and scaling factor. For example, the reference clock may be a highly accurate clock, such as a GPS one synchronised clock.

The received data may further include an output of a third seismic sensor, the third seismic sensor having been located collinearly with the first and the second seismic sensors and having a third clock which is synchronised with the second clock. The method may further comprise:

identifying, relative to a third clock in the third seismic sensor, two further times associated with times of arrival of the first seismic signal and the second seismic signal at the third seismic sensor; and determining the offset of the first clock relative to the second and third clocks using the first, second, third, fourth and two further times.

In this embodiment, the method may comprise: calculating an average of the first and second times and an average of the third, fourth, fifth and sixth times, the offset being based on a difference of the calculated averages.

For increased accuracy, more than one seismic sensor (in this case the second and third) may be used to calculate an offset for the clock of the first seismic sensor.

The method can further comprise positioning first and second seismic sensors in an area and causing first and second seismic signals to be emitted so as to be sensed by the seismic sensors. Each seismic sensor may be provided with a clock such that times, relative to the clock, may be recorded associated with the sensing of the seismic signals.

Optionally, a first seismic signal can be emitted from a seismic source collocated with the first seismic sensor. Optionally, a second seismic signal can be emitted from a seismic source collocated with the second seismic sensor.

In embodiments, the second seismic signal is emitted from a seismic source arranged collinearly with the first and second seismic sensors and such that the second seismic sensor is located between the seismic source and the first seismic sensor. Further, the first seismic signal can be emitted from a seismic source arranged collinearly with the first and second seismic sensors and such that the second seismic sensor is located between the seismic source and the first seismic sensor.

To enable the seismic signals to propagate from one seismic sensor to the other, the seismic sources may be collocated with the seismic sensors, or may be arranged collinearly with the seismic sensors. In embodiments, a seismic source and a seismic sensor may be collocated, for example by being part of a single device. This single device may then be used in the synchronising of a plurality of remote seismic sensors.

According to another aspect, a method of determining a scaling factor for a clock in a seismic sensor is provided, the method comprising:

identifying, relative to the clock in the seismic sensor, time values corresponding to a periodic seismic signal sensed by the seismic sensor;

determining, using the identified time values, a scaling factor for the time values of the clock.

A scaling factor may be determined for the clock of a seismic sensor using a periodic seismic signal. This scaling factor accounts for variations in the increment rate of a given clock, often known as drift. Being able to correct for drift ensures that the timings of seismic signals received by the seismic sensor can be accurately determined over a prolonged period.

The identified time values can correspond to a given phase of the periodic seismic signal for a plurality of periods of the periodic seismic signal, and the scaling factor is determined based on a difference of the time values.

As an example, the time values corresponding to peaks or maxima in the periodic seismic signal may be identified. The period of the periodic seismic signal would correspond to the difference in time values between adjacent peaks and a scaling factor may be determined accordingly. Time values, or differences in time values, may be averaged for a number of periods to provide a more accurate seismic signal.

The method may include:

identifying seismic signal values corresponding to the identified time values, the seismic signal values being indicative of the periodic seismic signal received by the seismic sensor; and calculating at least one inner product of the seismic signal values relative to a seismic signal of known period, wherein the scaling factor is calculated based on the inner product.

An alternative method of determining a scaling factor for the time values is to calculate the inner product of the received seismic signal with seismic signals of known periodic length. The inner product will generate a maximum when the two seismic signals are in phase. The period of the known seismic signal may then be used to determine the scaling factor.

The periodic seismic signal may be a continuous monochromatic signal such as a sinusoidal seismic signal or it may comprise a plurality of discrete signals emitted at fixed intervals. By fixed intervals, it is meant that the time of emission is known, for example by recording the accurate time of emission in a memory. The interval may be constant.

In the method, a seismic data set recorded by at least one seismic sensor can be received and the scaling factor for the clock in said seismic sensor can be used to correct the time measured by said clock. The seismic data set can comprise recorded signals corresponding to the periodic seismic signal and recorded signals corresponding to multiple seismic acquisition emissions. For clarity, the seismic acquisition emissions are those emissions used to interrogate the subsurface. In this way, correction of the timing of the seismic data set is not performed until after the seismic data has been acquired. There is no real time correction. This can provide a simple and quick process with no specific burden on data handling or transfer in the field, during the survey.

Several scaling factors can be determined, one scaling factor for a selected section of the seismic data set. For example, a scaling factor may be determined for each pair of consecutive time values. Alternatively, a scaling factor may be determined for each of a series of time intervals, such as every 20, 30 or 40 minutes of recoded data (the length of the time interval will depend on the degree that the clock is expected to drift).

The method may further include the step of receiving offset data, corresponding to an initial offset, OFF, between the clock in each seismic sensor and a system time, said initial offset and scaling factor being used to correct the time measured by said clock.

Where the periodic signal is a continuous monochromatic signal, the scaling factor can be used to correct the time measured by said clock by correcting a series of consecutive time intervals, the first of said time intervals starting at a time, $\tau_0$, wherein $\tau_0$ is the time measured by the clock at which the initial offset is known, and by calculating the scaling factor, a, for each time interval, according to the equation:

$$a = \frac{l_t}{l_\tau}$$

where $l_t$ represents the known periodic length of the periodic signal and $l_\tau$ represents the periodic length of the measured signal. The time interval can be selected so that the drift does not vary significantly during the interval. In this way, the intervals can be corrected cumulatively.

Where the periodic signal is a plurality of discrete signals, the scaling factor can be used to correct the time measured by said clock according to the equation:

$$t_m = t_{pn} + A_{pn} \cdot (\tau_m - \tau_{pn})$$

where:

$t_m$ is the system time corresponding to a time $\tau_m$ measured by the clock $A_{pn}$, is the scaling factor for the $n^{th}$ period and can be calculated according to the equation $$A_{pn} = \frac{l_t}{\tau_{p(n+1)} - \tau_{pn}}$$

where: lt is periodicity of the plurality of discrete signals;

$\tau_{p(n+1)}$ is the time measured by the clock of the arrival at the sensor of the $(n+1)^{th}$ discrete signal; and $\tau_{pn}$ is the time measured by the clock of the arrival at the sensor of the $n^{th}$ discrete signal; and $t_{pn}$ is the system time corresponding to the arrival at the seismic sensor of the discrete signal preceding $\tau_m$ and can be calculated according to:

$$t_{pn} = t_{p1} + [(n-1) \cdot l_t]$$

where: $t_{p1}$ is the system time corresponding to the arrival of the first discrete signal after the time at which the initial offset is known.

According to a further aspect, the method can comprise:

identifying, relative to a first clock in a first seismic sensor, a first time associated with a time of arrival of a first seismic signal at the first seismic sensor, and a second time associated with a time of arrival of a second seismic signal at the first seismic sensor;

identifying, relative to a second clock in a second seismic sensor, a third time associated with a time of arrival of the first seismic signal at the second seismic sensor, and a fourth time associated with a time of arrival of the second seismic signal at the second seismic sensor;

wherein a direction of propagation of the first seismic signal was from the first seismic sensor towards the second seismic sensor, and a direction of propagation of the second seismic signal was from the second seismic sensor towards the first seismic sensor; and calculating an offset of the first clock relative to the second clock using the first, second, third and fourth times.

The invention provides methods which permit the use of low accuracy clocks in seismic sensors. Methods of the invention enable internal clocks in seismic sensors to be calibrated to a reference time ("system time"). Where a seismic source has an internal clock that is also calibrated to the system time, it is possible to determine the propagation time of a seismic wave from the source to the respective sensors accurately.

Typically, system time is the time according to an accurate clock such as a GPS synchronised clock.

Calibration of the internal clock of the seismic source to system time can optionally be achieved by providing the seismic source with an accurate internal clock.

In this way, the number of expensive GPS synchronised clocks required to perform a large seismic survey is minimised since most or all seismic receivers in the survey can have a cheaper, less accurate clock.

Further features and advantages will become apparent from the following description of preferred embodiments, given by way of example only, which is made with reference to the accompanying drawings.

BRIEF DESCRIPTION OF THE DRAWINGS

Systems, apparatuses and methods will now be described as embodiments, by way of example only, with reference to the accompanying figures in which:

FIG. 10 shows a schematic of a computerised apparatus for use in embodiments.

Several parts and components of the invention appear in more than one Figure; for the sake of clarity the same reference numeral will be used to refer to the same part and component in all of the Figures.

DETAILED DESCRIPTION

Figure 1:
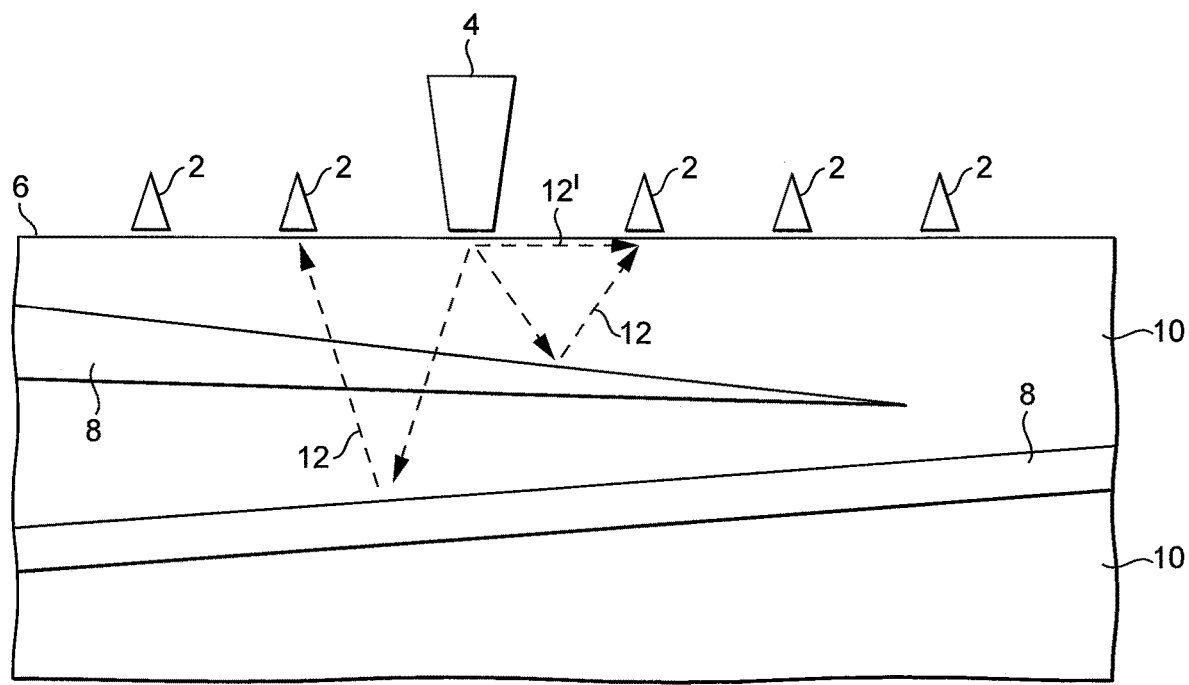
FIG. 1 shows a cross section schematic of the surface and subsurface of the earth.
Figure 2:
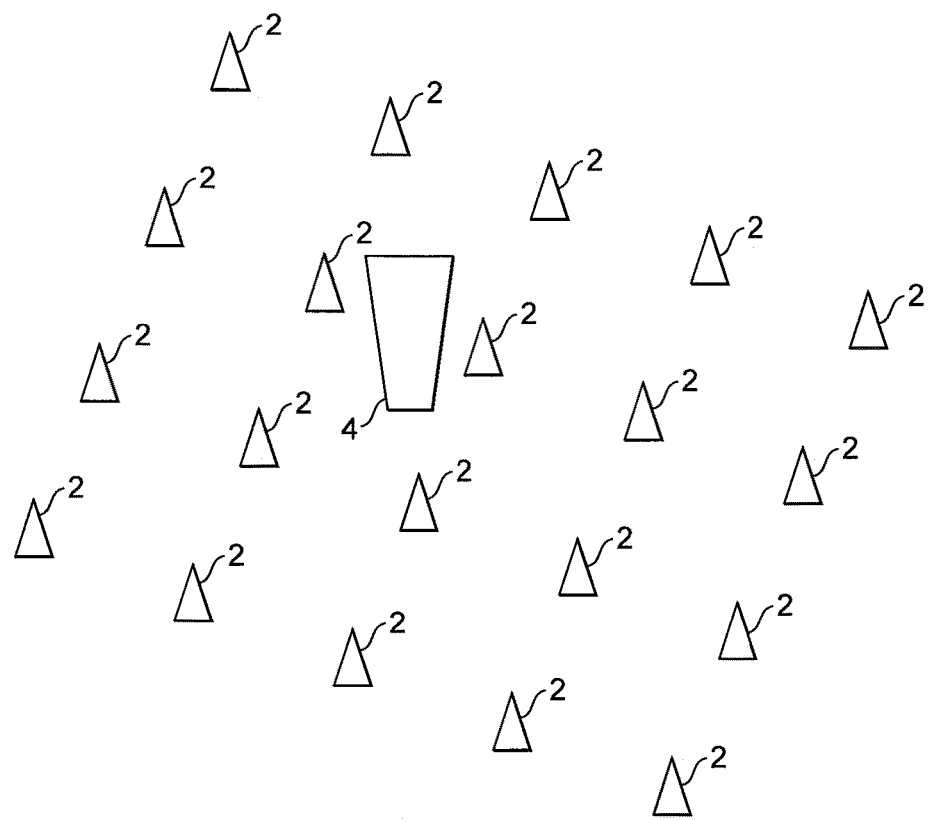
FIG. 2 shows a schematic view of a seismic surveying system.

In the following description, "synchronising a first clock relative to a second clock" is used to mean that the time value of the first clock has been brought in line with (i.e. is the same as) the time value of the second clock. The term "calibrating a first clock relative to a second clock" is used to mean that it is known how to map the time value of the first clock onto the time value of the second clock, for example by applying a correction factor to the time value of the first clock: the actual time value of the first clock is not modified to bring it in line with the second clock. It will be appreciated that synchronisation of the first clock to the second clock can be achieved after calibration by applying the correction factor and modifying the time value of the first clock.

As discussed, methods of the invention permit the use of cheap clocks in seismic acquisition sensors. A first aspect involves calibrating the clocks in the sensors to a system time. In other words, the relationship of each clock to system time is determined. System time is typically the time according to an accurate clock such as a GPS synchronised clock. Although this calibration process involves certain physical steps being carried out in the field before and/or during a seismic survey, the actual calibration is typically carried out offline after the sensors have been collected and the seismic data has been downloaded. That said, if the seismic data is transmitted from the sensors in real time to a processing facility, calibration could be commenced while the sensors are still collecting data in the field.

Methods for calibrating the clocks in the sensors to system time will be described in more detail later.

By calibrating the clocks in each sensor to system time, the relationship in time of the seismic data recorded by one sensor is known relative to the seismic data recorded by the other sensors, which is important for processing the seismic data as a whole and for producing a seismic image. According to methods of the invention, this relationship is preferably established for an early stage of the seismic acquisition process. However, if the clocks drift at a non-constant rate, as is likely, the relationship changes, and so continued use of that same relationship will result in errors.

It is therefore desirable to account for this continuing drift by recalibrating the clocks periodically. The frequency of this re-calibration can depend on the likely, or expected, degree of drift: the more significant the drift, the more frequent the calibration process is repeated.

The calibration process will now be described in detail. The calibration process involves (a) a particular physical arrangement of at least one seismic source and two seismic sensors, (b) the emission of two opposing seismic signals (described in more detail below) which are detected by the seismic sensors, and (c) specific data processing steps to calibrate the clock in one of the sensors relative to the clock in the other sensor.

Figure 3:
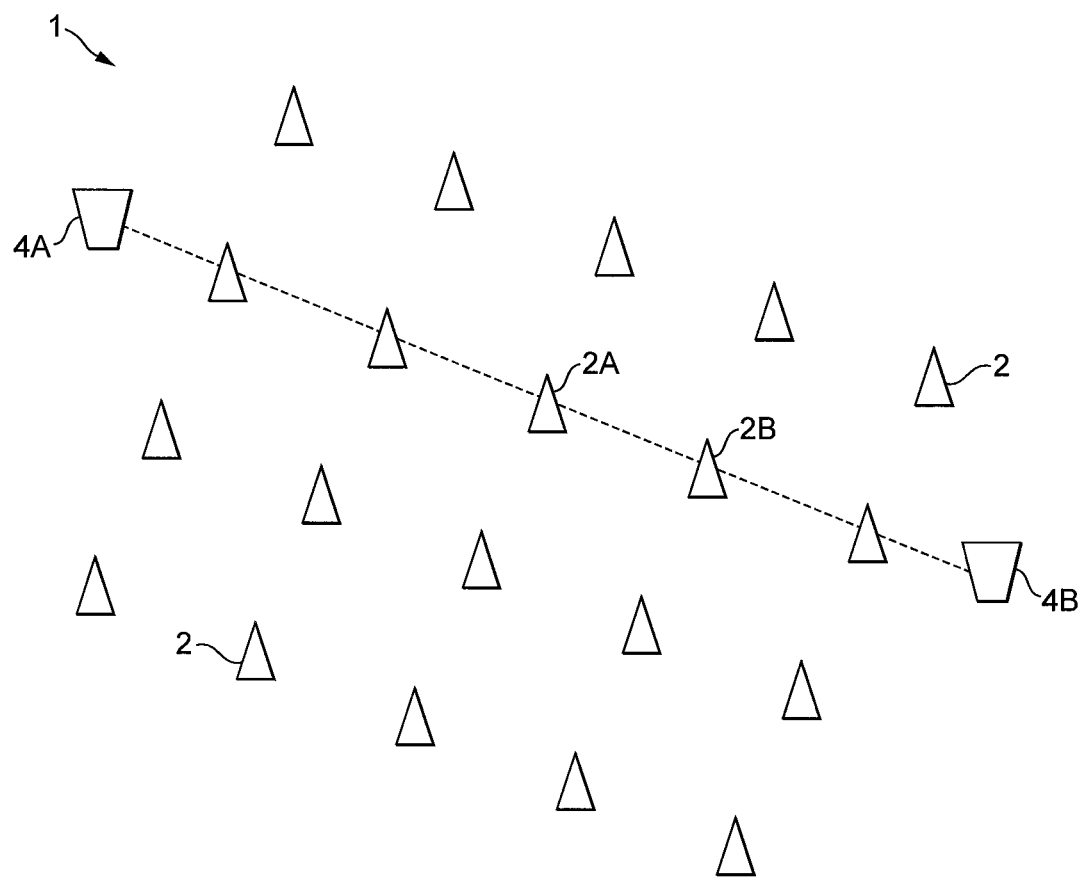
FIG. 3 shows a schematic view of a seismic surveying system according to an embodiment.

Referring to FIG. 3, a number of seismic sensors 2 are positioned in an area of interest. Of the seismic sensors, two (2A and 2B) will be referred to in relation to FIG. 4. Two seismic sources 4A and 4B are arranged collinearly with the seismic sensors 2A and 2B. Here, collinearly should be taken to mean that, when viewed from above, the seismic sensors and seismic sources are positioned along a line which is as close to straight as is practically possible. As the surface of the earth is not flat, both through elevation changes and the curvature of the earth, it will be appreciated that the seismic sensors and seismic sources may not be directly aligned along a single line, but rather that they are positioned in, as much as possible, the same vertical plane and on, or in, the earth's surface.

Each seismic sensor has a clock. Seismic sensor 2A has a first clock whose time value will be represented by $\tau$, and seismic sensor 2B has a second clock whose time value will be represented by t. One of the clocks, for example that in seismic sensor 2B, has a known relationship with system time. This could be achieved, for example, by providing the clock with a GPS receiver so that the clock represents system time. Alternatively, the clock could previously have been calibrated to system time using the method described here and optionally then synchronised to system time.

The seismic source 4A emits a first seismic signal, and the seismic source 4B emits a second seismic signal. Both seismic signals are sensed by the seismic sensors 2A and 2B. The seismic sensors 2A and 2B record time values, relative to the clock of the respective seismic sensor, indicative of the time of arrival (ToA) of the seismic signal at that seismic sensor. Naturally, each sensor will detect the first break as well as at least one reflected wave. In this embodiment, discussion of detecting the ToA of a seismic signal will relate to detecting the arrival of the first break at the sensor. Further, particularly where the signal emitted by the seismic source is a sweep, rather than a short pulse, subsequent data processing steps can include cross correlating the emitted signal with the recorded signal to help collapse the wavelet and identify the ToA of the signal at the seismic sensor.

Due to the collinear arrangement of the seismic sensors 2A and 2B, and of the seismic sources 4A and 4B, the signal emitted by source 4A and detected by sensor 2B propagates generally along the same path along/through the ground as the signal emitted by source 4B and detected by sensor 2A, but the direction of propagation of the two seismic signals is opposed. This is what is meant by "opposing seismic signals". Accordingly, the travel time between sensor 2A and sensor 2B of the wave emitted by source 4A is the same as the travel time between sensor 2B and sensor 2A of the wave emitted by source 4B, provided the Earth's Green's Function is unchanged.

Figure 4:
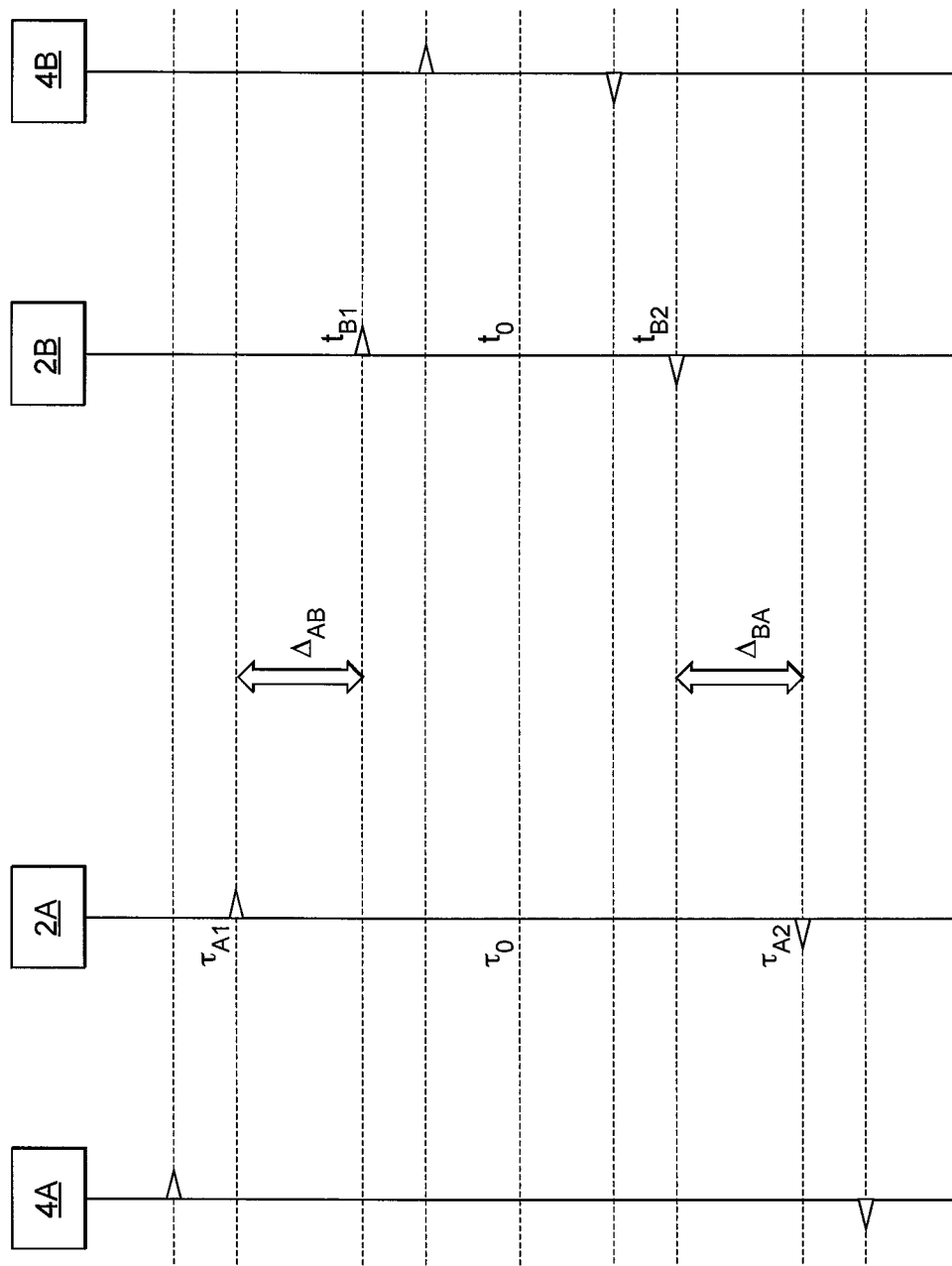
FIG. 4 shows a timing diagram for the system of FIG. 3.

FIG. 4 shows a timing diagram for the system described above. As stated above, the value of the clock in seismic sensor 2A is identified by $\tau$, and the value of the clock in seismic sensor 2B is identified by t. Further, the clock in seismic sensor 2B has a known relationship with system time. Indices will be used to identify the values of the clocks at given points in system time, i.e. $\tau_n$ refers to the time according to the clock in sensor 2A at system time n, and $t_n$ refers to the time according to the clock in sensor 2B at system time n.

As shown in FIG. 4, the signal emitted by source 4A is detected by sensor 2A at time $\tau_{A1}$. That signal progresses through the earth and is detected at sensor 2B at time $t_{B1}$. Similarly, the signal emitted by source 4B is detected by sensors 2B and 2A at times $\tau_{B2}$ and $\tau_{A2}$ respectively. $\Delta_{AB}$ is the propagation time of the signal from sensor 2A to sensor 2B. $\Delta_{BA}$ is the propagation time of the signal from sensor 2B to sensor 2A and is the same as $\Delta_{AB}$ (if measured in system time).

The two seismic signals emitted by sources 4A and 4B are emitted in relatively quick succession such that any drift of the clock in sensor 2A can be assumed to be constant.

The relationship between the two clocks in sensors 2A and 2B can be defined as:

$$t_n - t_0 = a(\tau_n - \tau_0) \tag{1}$$

where:
'a' represents a scaling factor which accounts for both design differences in increment rate and for drift, the latter of which can be assumed to be constant;
$t_n$ is the time according to the clock in sensor 2B at a GPS time n;
$\tau_n$ is the time according to the clock in sensor 2A at a GPS time n;
$t_0$ is the time according to the clock in sensor 2B at "zero time";
$\tau_o$ is the time according to the clock in sensor 2A at "zero time".

"Zero time" is a system time when the values of the clocks in sensors 2A and 2B are both known (explained further below).

$t_0$ can be defined as the midpoint between $t_{B1}$ and $t_{B2}$, that is:

$$t_0 = \tfrac{1}{2}(t_{B1} + t_{B2}) \tag{2}$$

Since it is assumed that the drift of the clock in sensor 2A is constant, and assuming that the Earth's Green's function does not vary over the time period that the signals are emitted from sources 4A and 4B, $\tau_o$ can be defined as the midpoint between $\tau_{A1}$ and $\tau_{A2}$, that is:

$$\tau_0 = \tfrac{1}{2}(\tau_{A1} + \tau_{A2}) \tag{3}$$

The difference in value between $t_0$ and $\tau_o$ is the offset ("OFF") between the clocks in sensors 2A and 2B at "zero time". In other words, it is the value needed to be added to the time measured by the clock in sensor 2A to map that clock to the clock in sensor 2B at zero time. It will be understood that the offset may be a positive or negative value.

Since $t_0$ is already calibrated or synchronised to system time, the offset can be used to map sensor 2A's $\tau_o$ value to system time.

It can be seen from this that, by examining the seismic data recorded by sensors 2A and 2B, and identifying the ToAs of the signals emitted by sources 4A and 4B (i.e. by identifying $\tau_{A1}, \tau_{A2}, t_{B1}$ and $t_{B2}$) it is possible to map the time value of the clock in sensor 2A onto the time value of the clock in sensor 2B, and therefore onto system time, at "zero time".

It is possible to determine how the time value of the clock in sensor 2A maps onto the time value of the clock in sensor 2B (and therefore onto system time) at other points in time as follows.

Substituting equations (2) and (3) into equation (1) and rearranging, gives:

$$t_n = a\tau_n + \tfrac{1}{2}(t_{B1} + t_{B2}) - \tfrac{1}{2}a(\tau_{A1} + \tau_{A2}) \tag{4}$$

Once the scaling factor "a" is known, it is possible to map any time value, $\tau_n$, according to the clock in sensor 2A to the time, $t_n$, according to the clock in sensor 2B (and consequently to system time). To determine the scaling factor "a", a second pair of opposing seismic signals is emitted, for example by seismic sources 4A and 4B. The second signal emitted by source 4A is detected by sensor 2A at time value $\tau_{A3}$, and by sensor 2B at time value $t_{B3}$. The second signal emitted by source 4B is detected by sensor 2B at time value $t_{B4}$, and by sensor 2A at time value $\tau_{A4}$.

Rearranging equation (1) gives:

$$a = \frac{t_n - t_0}{\tau_n - \tau_0} \tag{5}$$

In the same way that $t_0$ and $\tau_0$ are defined above as "zero time" for the first pair of opposing seismic shots, $t_1$ and $\tau_1$ can be defined as "zero time" for the second pair of opposing seismic shots:

$$t_1 = \tfrac{1}{2}(t_{B3} + t_{B4}) \tag{6}$$

$$\tau_1 = \tfrac{1}{2}(\tau_{A3} + \tau_{A4}) \tag{7}$$

Treating $t_1$ as $t_n$ and $\tau_1$ as $\tau_n$, and substituting equations (2) and (3), and (6) and (7) into (5) gives:

$$a = \frac{t_{B3} + t_{B4} - t_{B1} - t_{B2}}{\tau_{A3} + \tau_{A4} - \tau_{A1} - \tau_{A2}} \tag{8}$$

The above enables calibration of the clock in sensor 2A with that in sensor 2B (and therefore with system time) for any point in the seismic data, assuming drift is constant. However, it has been found that clocks do not drift at a constant rate. The invention provides for emitting yet another pair of opposing seismic signals (i.e. a third pair of signals), for example one emission from each of seismic sources 4A and 4B, at a later point in time. The above process can be repeated so as to determine the scaling factor corresponding to the time period between the second and third pair of emissions. This recalibration process can be carried out at a frequency appropriate to the rate of change of drift in the clock in sensor 2A.

As mentioned, the clock in sensor 2B is calibrated or synchronised to system time, for example GPS time. If the clock in sensor 2B is not itself a GPS synchronised clock (i.e. if it suffers from drift), then recalibration (and optionally re-synchronisation) of that clock will be required in order for the recalibration of the clock in sensor 2A to be meaningful.

The above described methods can be used to carry out a seismic survey. During the survey, seismic sources are positioned and controlled to emit pairs of opposing seismic signals which are then recorded by the various sensors deployed in the field. For example, two sources (for example vibroseis trucks) are provided and positioned so there is one at either end of a line of sensors ("a receiver line"). A seismic sensor is co-located with a first of the sources (either by providing a single unit which comprises a source and a sensor, or by locating a sensor adjacent to the source), and the seismic sensor is provided with a clock which is synchronised to GPS time. The two sources each emit a signal according to the description above. The propagation of those two signals is detected by the sensor associated with the first source as well as by each of the sensors in the receiver line.

If it is only desired to determine the offset required to map the time of the clocks in each sensor in the receiver line to the time of the clock in the sensor associated with the first source (i.e. GPS time) at "zero time", then no further physical steps are required.

If it is desired to understand the relationship between the clocks in the sensors in the receiver line and the clock in the sensor associated with the first source, then the two sources each emit a further signal, the propagation of which is detected by the sensor associated with the first source as well as by each of the sensors in the line.

If the clocks in the receiver line are likely to drift at a non-constant rate, then the sources will be used to emit a third pair of opposing seismic signals some time later. This may be a number of hours later or may be a day or more later, depending on how quickly the drift is likely to change. This re-calibration step may be repeated as many times as is needed throughout the seismic acquisition survey.

It is not necessary for the seismic sources to remain in position between the first, second and subsequent signal-pair emissions. In fact, the sources can be moved to new positions during these periods to emit pairs of opposing seismic signals to be used in calibrating the clocks in other nearby receiver lines.

To enable calibration of other sources in the survey, the sources can be moved to opposing ends of another receiver line e.g. adjacent to the first line and the process can be repeated. Alternatively, the sources or a different pair of sources can be moved to opposing ends of a second receiver line arranged at an angle, for example perpendicular, to the first receiver line, provided that one of the receivers in this second receiver line was also part of the first receiver line. In this case, neither source has to have a sensor with an accurate clock associated with it. Instead, the sensor which was part of the first receiver line plays the role of the sensor with a known time, because the relationship of that sensor's clock can be determined in later processing and subsequently used as the accurate clock for the second receiver line. One, two or more pairs, as required, of opposing seismic signals are emitted for the second receiver line.

The seismic sources, or further pairs of seismic sources are used and pairs of opposing seismic signals are emitted until all the sensors in the field have been part of a receiver line in accordance with the methods of this invention.

After the seismic survey is complete, the sensors are collected and the seismic data from each sensor is downloaded. For each sensor, the recorded data is analysed in accordance with the methods described above, to enable an understanding of the relationship between the time of its clock and GPS time. For example, a first sensor in the first receiver line may be considered in connection with the sensor associated with the first source. The offset required to map the time of the clock in that first sensor to the GPS time of the sensor associated with the source, at "zero time", can be determined using equations (2) and (3) above.

If a second pair of opposing seismic signals was emitted during the acquisition process, then the scaling factor, a, can be calculated using equation (8).

If a third and subsequent pairs of opposing seismic signals were emitted, then the clock in the sensor under consideration can be recalibrated. This can be done either by determining the offset and scaling factor again using the second and third, or third and fourth etc pairs of opposing seismic signals, or by correcting the time in the clock under consideration using the first scaling factor for the first period and the second scaling factor for the second period etc. However, this latter method introduces a degree of error.

Alternatives of the invention will now be described.

As an alternative to calculating the scaling factor, a, as described above, it is possible to determine the scaling factor by emitting a further seismic signal from one side of the receiver line, for example from source 4A. In other words, a first seismic signal is emitted from one side of the receiver line, e.g. from source 4A as described above in connection with FIG. 3. A second seismic signal is emitted from the opposing side of the receiver line, e.g. from source 4B. A third seismic signal is emitted from the first side of the receiver line i.e. source 4A. The first and second seismic signals can be used to determine the offset required to map the time of the clock in sensor 2A to the clock in sensor 2B at "zero time" as described above. The third seismic signal can then be used to calculate the scaling factor as follows. The scaling factor can then be used in equation (4) to enable the mapping of the time of the clock in sensor 2A onto the time of the clock in sensor 2B at other times.

To determine the scaling factor according to this technique, the time according to the clock in sensor 2A between receiving the first seismic signal and the third seismic signal is determined. The time according to the clock in sensor 2B between receiving the first seismic signal and the third seismic signal is also determined. The ratio between these two time periods is the scaling factor, a.

Figure 5:
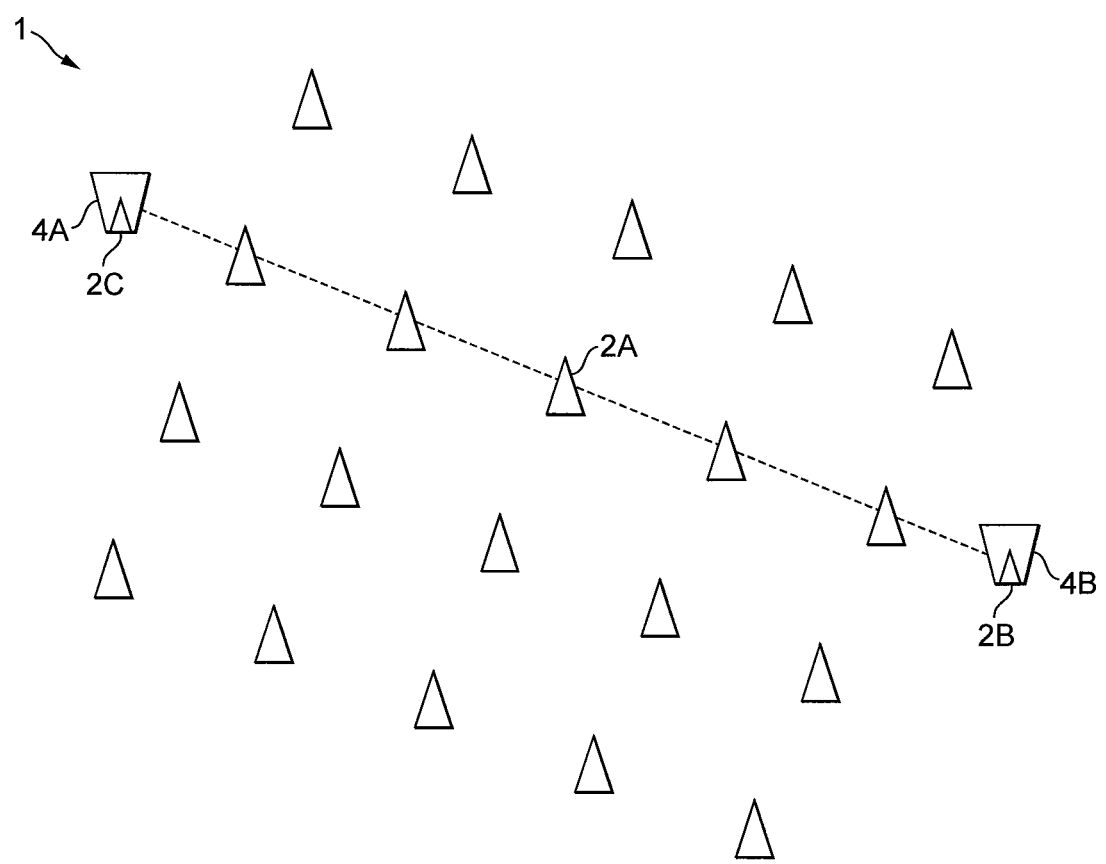
FIG. 5 shows a schematic view of a seismic surveying system according to another embodiment.
Figure 6:
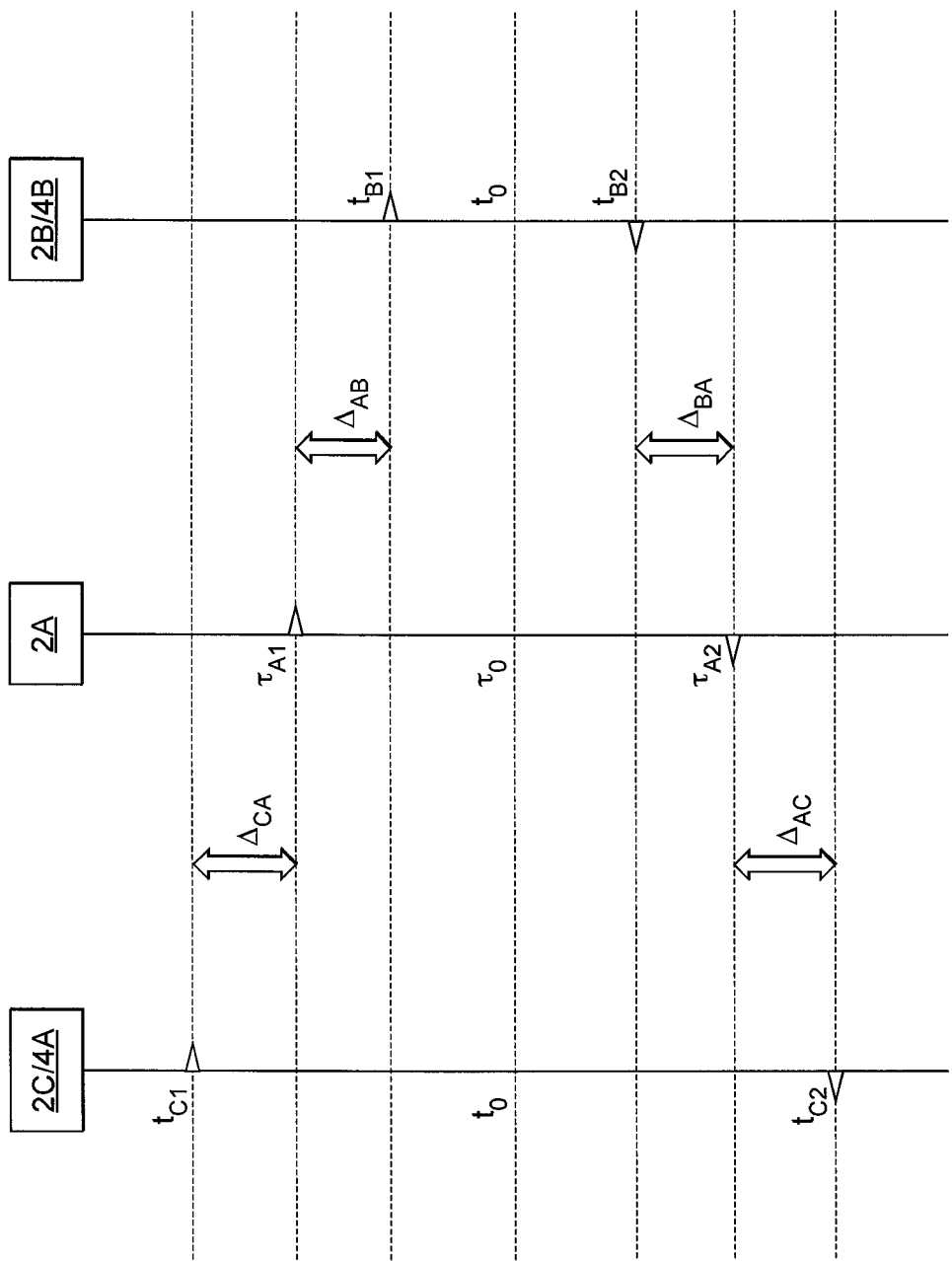
FIG. 6 shows a timing diagram for the system of FIG. 5.

In another example, referring to FIGS. 5 and 6, a number of seismic sensors are shown positioned in an area of interest. Seismic sensors, 2A, 2B and 2C, will be referred to in relation to FIG. 6. Two seismic sources 4A and 4B are arranged collinearly with the seismic sensor 2A—that is seismic sensor 2A is located between the two seismic sources.

Seismic sources 4A and 4B, in this embodiment, also comprise the seismic sensors 2C and 2B respectively. The combined seismic sensors and seismic sources may be formed as a single device, or simply be connected. In general, it can be said that the seismic sources are collocated with respective seismic sensors.

Each of the seismic sensors, 2A, 2B and 2C have clocks. In line with the above description, seismic sensor 2A will have a first clock whose time value will be represented by $\tau$, however seismic sensors 2B and 2C will have clocks, collectively second clocks, which are synchronised with each other and therefore have the same time value, represented by t. These second clocks may be synchronised with system time. In line with the above, it may be the case that calibration data for the clocks 2B and 2C has already been determined, and that the time value attributed to one or both of the clocks represents a time value mapped via an equivalent of equation 1 above.

The seismic source 4A emits a first seismic signal, and the seismic source 4B emits a second seismic signal. Both seismic signals are sensed by the seismic sensors 2A, 2B and 2C. The time of emission of the first seismic signal is the same as the ToA of the first seismic signal at the seismic sensor 2C, and is represented by $t_{C1}$. The ToA of the first seismic signal at seismic sensor 2A is then $\tau_{A1}$, and the ToA of the first seismic signal at seismic sensor 2B is $t_{B1}$. Similarly, the time of emission of the second seismic signal is the same as the ToA of the second seismic signal at the seismic sensor 2B, and is represented by $t_{B2}$. The ToA for the second seismic signal at seismic sensor 2A is $T_{A2}$ and at seismic sensor 2C is $t_{C2}$.

Equation 3 above gives the value for $\tau_0$:

$$\tau_0 = \tfrac{1}{2}(\tau_{A1} + \tau_{A2}) \tag{9}$$

In addition, equation 2 above gives two values for $t_0$. At seismic sensor 2C:

$$t_0 = \tfrac{1}{2}(t_{C1} + t_{C2}) \tag{10}$$

and at seismic sensor 2B:

$$t_0 = \tfrac{1}{2}(t_{B1} + t_{B2}) \tag{11}$$

Equations 10 and 11 may be averaged to give a more accurate value for $t_0$. Substituting the average into equation 1 and rearranging gives:

$$\tau_n = at_n + \tfrac{1}{4}(t_{C1} + t_{C2} + t_{B1} + t_{B2}) - \tfrac{1}{2}(a\tau_{A1} + a\tau_{A2}) \tag{12}$$

Therefore, two seismic sensors 2B and 2C may be used to determine a more accurate calibration for the clock in the seismic sensor 2A. This may be particularly useful where the seismic sensor to be calibrated, in this example seismic sensor 2A is located between the other seismic sensors 2B and 2C as any variations in the propagation times of the seismic signal may be, at least partially, accounted for.

The above describes methods for use in calibrating a first clock with one or more second clocks. It will be appreciated that various combinations of the embodiments described may be used. For example, in the first embodiment shown in FIGS. 3 and 4, either or both of the seismic sensors 2A and 2B may be collocated with a seismic source. Likewise, in the embodiment shown in FIGS. 5 and 6 one or both of the seismic sensors 2B and 2C may not be collocated with the seismic sensors 4B and 4A respectively. In the latter case, the seismic sensors and seismic sources may still be collinearly arranged.

Figure 7:
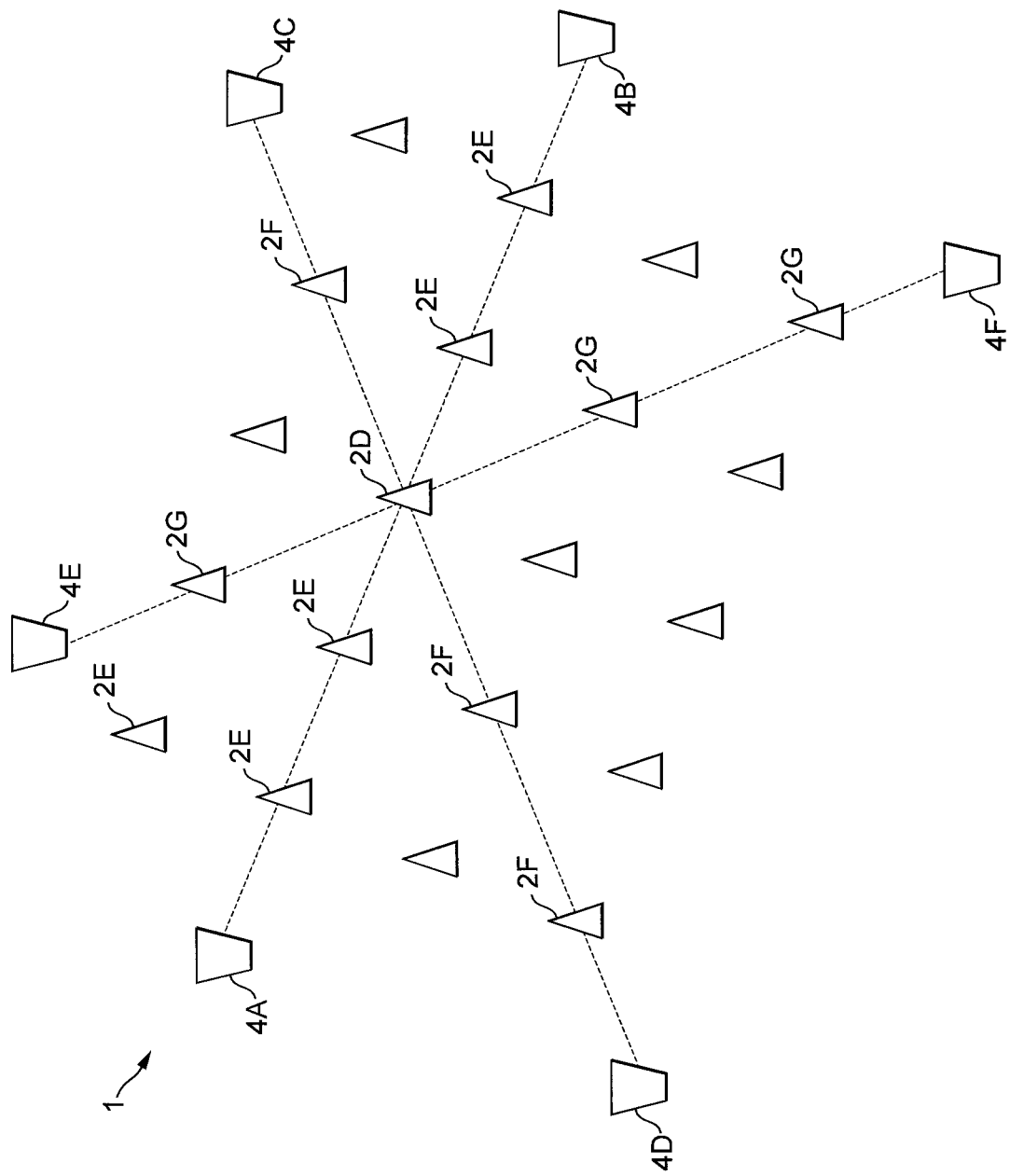
FIG. 7 shows a schematic view of a seismic surveying system according to a further embodiment.

In some embodiments, a given seismic sensor may be calibrated using more than two seismic signals, and with any number of other seismic sensors. FIG. 7 illustrates how such an embodiment may operate.

In FIG. 7, a plurality of pairs of seismic sources are arranged in different configurations such that at least one seismic sensor is collinear with the seismic sources. Seismic sources 4A and 4B are collinear with seismic sensor 2D and the four seismic sensors with reference 2E. Seismic sources 4C and 4D are collinear with seismic sensor 2D and the three seismic sensors with reference 2F. Seismic sources 4E and 4F are collinear with seismic sensor 2D and the three seismic sensors with reference 2G. This effect may be achieved by using more than two seismic sources, or by moving a pair of seismic sources between emissions of seismic signals.

Using seismic sources 4A and 4B, all of seismic sensors 2E may be calibrated in relation to seismic sensor 2D. Likewise seismic sources 4C and 4D may be used to calibrate seismic sensors 2F, and seismic sources 4E and 4F may be used to calibrate seismic sensors 2G. Seismic sensor 2D may be provided with an accurate clock calibrated with or synchronised to system time.

Over a large array of seismic sensors, a relatively small number of seismic sensors may be provided with accurate clocks, enabling these seismic sensors to be used to calibrate a relatively large number of surrounding seismic sensors.

In other embodiments, the seismic sensor 2D may not be provided with an accurate clock. Instead, each of the seismic sources 4A to 4F may have seismic sensors (in line with the embodiment described above in relation to FIGS. 5 and 6). These may subsequently be used to calibrate the clock in the seismic sensor 2D multiple times with, e.g. an average being taken. The use of multiple calibrations ensures that the seismic sensor 2D is more accurately calibrated than if only one calibration was used. Consequently seismic sensor 2D may be used to calibrate surrounding seismic sensors.

Further aspects according to the present invention will now be described.

In one such further aspect, the drift over time of a clock in a sensor 2A can be corrected on a more continuous basis. In this aspect, the first step is to establish the initial offset of the clock in sensor 2A with respect to system time. This can optionally be achieved in accordance with the above method described in connection with FIGS. 3 to 6, i.e. it can be established how the time value, $\tau_o$, for the clock in sensor 2A can be mapped to the time value, $t_0$, for the clock in sensor 2B, where the clock in sensor 2B is calibrated or synchronised to system time.

This aspect involves emitting a repeating seismic signal throughout the geographical area of the seismic survey. The repeating signal is recorded like a time stamp in the seismic data of each seismic sensor. This time stamp can then be identified in later data processing steps to enable correction of the drift during data processing.

According to an embodiment, a seismic source ("timing source") located in an acquisition area emits the repeating signal. The repeating signal can be a discrete signal such as an impulse or sweep which is repeated at a known, and typically constant, rate over the course of the survey. Alternatively, the repeating signal can be a continuous signal such as a monochromatic signal, for example a sinusoidal signal, which is emitted continuously over the course of the survey. The timing source can be arranged to emit its repeating signal starting from just before the first seismic sensor is deployed in the field. In this way, as soon as a sensor is deployed and switched on, it records the repeating signal.

Although the propagation time of a discrete signal from the timing source to any given seismic sensor is unknown, the propagation time is constant over the course of the survey (provided the Earth's Green's function remains the same).

Similarly, for a continuous sinusoidal signal, the time between specific repeating points on the sinusoidal signal (e.g. the peaks of the waveform) are constant over the course of the survey.

When the seismic acquisition survey is complete, the sensors are collected from the field and the data downloaded. In an alternative, the data could be communicated in real time to a data collection unit, while the seismic acquisition survey is ongoing.

By examining the seismic data recorded by a sensor to identify the repeating signal, it is possible to determine if the clock in that sensor has drifted and to correct for that drift.

Figure 8:
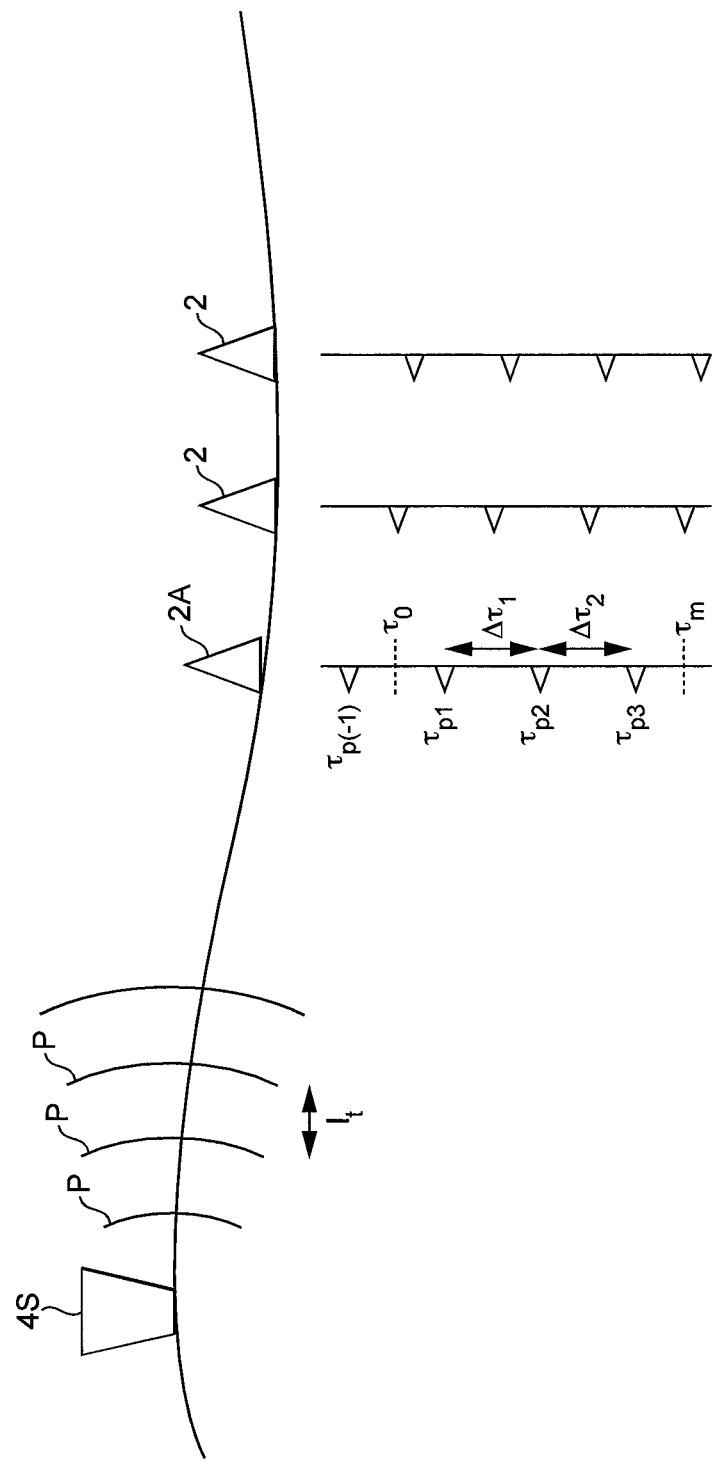
FIG. 8 shows a schematic of an embodiment of the invention.

One embodiment of this methodology is shown in FIG. 8, which shows a depiction of a seismic source 4S emitting a discrete signal, p. The source 4S is provided with a GPS synchronised clock so that the emission times are accurately controlled to a pre-set periodicity, $l_t$. For example, a seismic sweep, say of 10 seconds duration, may be emitted every 30 minutes. The source 4S emits each signal from the same location, to ensure that the propagation time to each sensor 2 is constant for each repetition.

The propagated discrete signal recorded by sensor 2A can be identified by cross correlating the emitted seismic sweep with the recorded data to determine the ToA of the discrete signal at the sensor ($\tau_{p1}$, $\tau_{p2}$, $\tau_{p3}$ etc).

As mentioned, the offset between the clock in sensor 2A and system time (e.g. GPS time) has already been established, for example by way of the method described above. Accordingly, the ratio between the periodicity, $l_t$, and the difference in time between the ToAs of consecutive discrete signals (i.e. $\Delta\tau_1$, $\Delta\tau_2$ etc) can be used to determine the relationship between the time of the clock in sensor 2A and system time.

The frequency of emission of the discrete signal is chosen such that the level of drift likely to occur between two consecutive discrete signals is low. Drift in the clock in sensor 2A between the point at which the offset has been determined (i.e. $\tau_0$ for the above method of establishing offset) and the ToA of the first discrete signal following $\tau_0$ can be treated as zero. In FIG. 8, the first discrete signal recorded after $\tau_0$ is $\tau_{p1}$. $\tau_{p1}$ can be mapped onto system time, t according to:

$$t_{p1} = \tau_{p1} - \text{OFF} \quad (13)$$

where:
$t_{p1}$ is the system time corresponding to $\tau_{p1}$;
$\tau_{p1}$ is the ToA of the first discrete signal received after the point at which the offset has been determined; and
OFF is the offset between the clock in the sensor and system time (i.e. the clock in the source). In the case where the offset is established using the technique described above and in which the clock in sensor 2B has been synchronised to system time:

$$\text{OFF} = \tau_0 - t_0 \quad (14)$$

Once the system time corresponding to $\tau_{p1}$ has been established, drift occurring in the remainder of the seismic data can be corrected. It is known that the difference between consecutive timing signals is the periodicity, $l_t$, which is predefined. So, the system time, $t_{pn}$, corresponding to the ToA of the nth discrete signal received by the sensor is:

$$t_{pn} = t_{p1} + [(n-1) \cdot l_t] \quad (15)$$

To understand the relationship between the clock in the sensor and system time for times between the $n^{th}$ and the $(n+1)^{th}$ discrete signals, a scaling factor for the $n^{th}$ period, $A_{pn}$, can be determined as follows:

$$A_{pn} = \frac{l_t}{\tau_{p(n+1)} - \tau_{pn}} \quad (16)$$

So the system time, $t_m$, corresponding to any time, $\tau_m$, measured by the sensor's clock can be defined as:

$$t_m = t_{pn} + A_{pn} \cdot (\tau_m - \tau_{pn}) \quad (17)$$

where "pn" corresponds to the last discrete signal recorded before $\tau_m$.

In an alternative to this approach, rather than assuming there is no drift between $\tau_0$ and $\tau_{p1}$, a potentially more accurate value for $t_{p1}$ may be obtained by calculating the scaling factor, A, for the time period between $\tau_N$ and $\tau_{p(-1)}$, where $\tau_{p(-1)}$, is the ToA of the last discrete signal recorded by the sensor before $\tau_0$. It will be understood that discrete signals are recorded before $\tau_0$ because emission of the discrete signal is commenced before the sensors are deployed/switched on.

In a further alternative, the timing source need not remain in the same location in the survey area throughout the survey. The timing source can instead progress along the survey area as the acquisition process progresses. In this case, a seismic source taking part in the seismic acquisition survey may be used to carry out the second function of emitting the discrete signal. For example, the source can emit discrete signals from the same location while the sensors are being deployed in the field. Once the sensors are deployed, the source can start moving around the acquisition area emitting signals for the purpose of the acquisition process.

As the time approaches to emit the next discrete signal, the source can move back to one of the shot points at which it has already shot. By shot point, it is meant a location at which the source emitted a "shot" i.e. seismic signal for the purpose of seismic acquisition. This will be different to the location at which the previous discrete signals were emitted. Because the source has already emitted a signal from that shot point at a time that has been precisely recorded for the purpose of the seismic acquisition, a second shot emitted from that same location can be used in a similar way to the method described above, to enable the times of inaccurate clocks on sensors to be mapped onto system time.

In this example, and indeed in the example described above, the time between consecutive discrete signals need not be constant, provided at least two signals are emitted from any given location and the exact times of those emissions are known.

Additionally, in very large geographical areas, more than one timing source may be used to ensure all sensors in the area detect the discrete signal. The discrete signal emitted by the different timing sources may be different, for example different sweeps, to enable the relevant discrete signal to be isolated during processing.

In embodiments where a continuous monochromatic signal is used, for example a sinusoidal signal, the signal is emitted from a stationary source. The periodic length of the signal is a known constant, and so the scaling factor may be determined by comparing the periodic length of the signal measured by the sensor and the known periodic length.

Optionally, in embodiments, a notch filter can be applied to isolate the monochromatic signal recorded by the sensor. The width of the notch filter can be selected to capture the expected distortion in the recorded signal caused by drift in the clock. A notch filter may not be necessary if the techniques (described below) for determining the frequency of the recorded timing signal are sufficient. However, a notch filter may be beneficial if the timing signal is weak or the background noise, for example from other seismic activity, is relatively large.

To determine the periodic length of the waveform, as measured by the sensor, a number of techniques are known to the skilled person for determining the frequency of a signal. This determined frequency can then be compared to the known frequency of the emitted timing signal.

For example, an inner product of the measured waveform at a selected time and sample waveforms having known periodic lengths can be calculated. The sample which provides the largest inner product has a periodic length which most closely matches the periodic length of the waveform measured by the sensor, and so that periodic length is said to be the measured periodic length, which is used to determine the scaling factor, a.

Alternatively, the emitted signal and the recorded signal can be compared using a warping function such as used in dynamic warping or optical image warping, to determine how the emitted signal has been changed due to clock drift. The periodic length of the recorded signal can be determined using this change.

As a further alternative, a Fourier transform may be used to determine the frequency components present in the recorded data, so as to determine how much the frequency has changed. Accordingly, the periodic length of the recorded data can then be determined.

As a further option, the Hilbert transform, a well known linear operator, can be used to analyse the signal measured by the sensor at a given time, to determine the instantaneous frequency of the measured signal. This frequency, so determined, can be compared to the known frequency of the emitted signal.

The scaling factor, a, may be then determined by:

$$a = \frac{l_t}{l_{\tau,max}} \quad (18)$$

where $l_t$ represents the known periodic length of the periodic signal; and
$l_{\tau,max}$ represents the periodic length of signal corresponding to the largest inner product.

The system time corresponding to any time according to the clock in a sensor 2 can be determined by starting from the point at which the offset has been determined and applying the scaling factor to the time recorded by the clock in the sensor. If the drift is likely to vary over time, the recorded data may be split into discrete sections and a scaling factor may be calculated for each discrete section such that the time can be corrected cumulatively.

By using the above methods, alone or in combination, it is possible to calibrate a first clock in a seismic sensor with a second clock without the need for the first clock to be a high accuracy clock such as a GPS synchronised clock.

Figure 9:
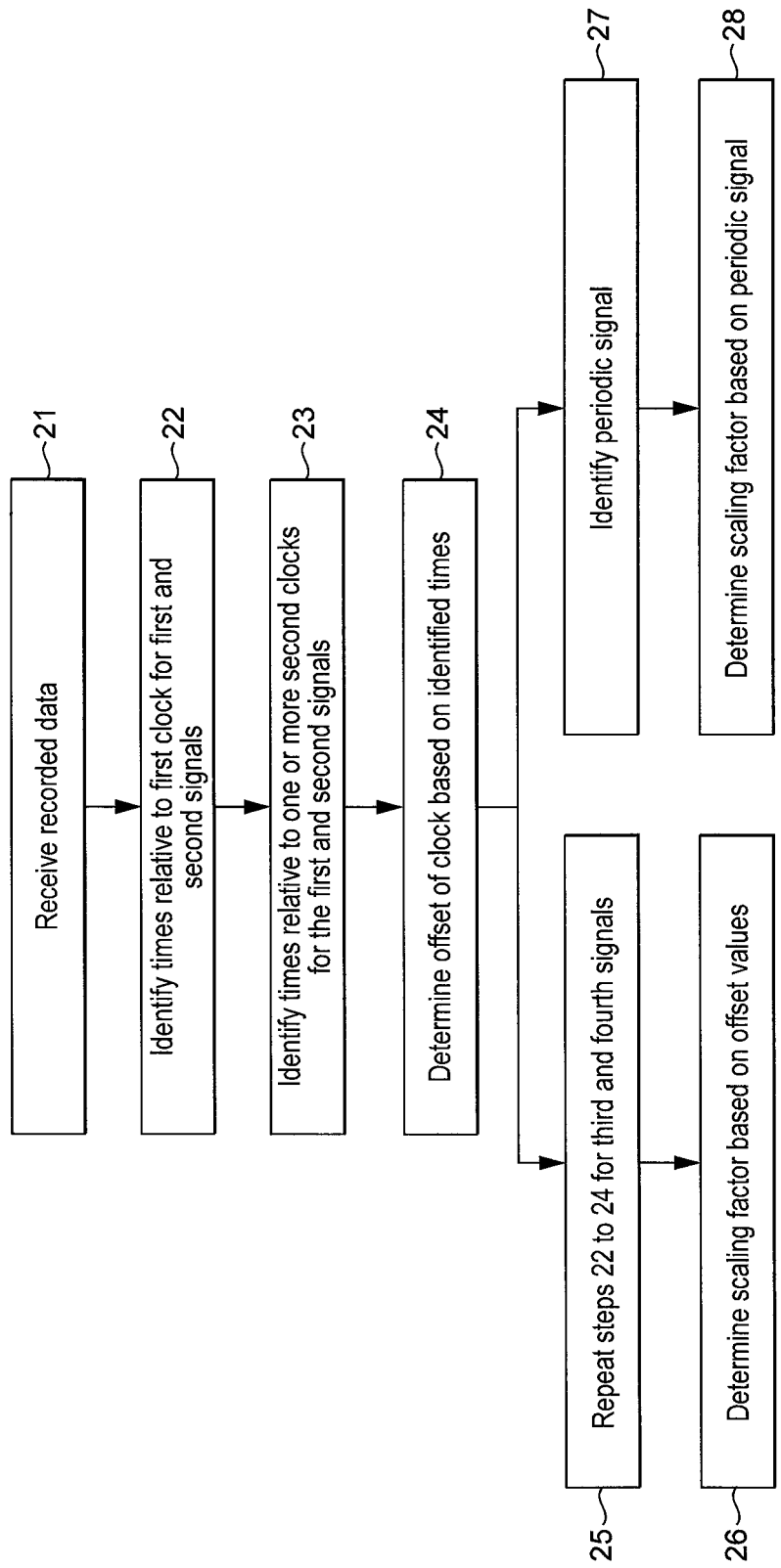
FIG. 9 shows a general method according to embodiments.

A general method of calibrating a clock in a seismic sensor will be described with reference to FIG. 9. In a first step 21, data recorded by the seismic sensors is received. In a second step 22, times relative to the first clock for a first and second signal are identified. These may be the ToA times for the first and second signals described above. In step 23, times relative to one or more second clocks are identified for the first and second signals. There may be only a single second clock as in FIG. 4, or multiple second clocks as in FIG. 6. In step 24, the offset of the first clock is determined based on the identified times. This may be done by taking an average of the times relative to the first clock, and an average of the times relative to the one or more second clocks, and differencing the averages.

Following on from the determination of the offset in step 24, a scaling factor may be determined by either the steps 25 and 26, or the steps 27 and 28 (or a combination of the two).

In step 25, step 22 to 24 above are repeated for a third and fourth signal. These may be used to determine an offset for the first clock at a later time. Based on the two offset values the scaling factor may be determined using, for example, equation 8 above.

Alternatively, or additionally, in step 27 a timing signal is identified in the received data. This periodic signal may be used, in step 28, to determine the scaling factor.

The above methods may be conducted by a suitable computer system. A schematic block diagram showing such a computer system 50 will now be described with reference to FIG. 10. The computer system 50 comprises a processing system 52 having a processor, or CPU, 54 which is connected to a volatile memory (i.e. RAM) 56 and a non-volatile memory (such as a hard drive or a removable memory such as a disk or flash drive) 58. Software components 60, carrying instructions for implementing embodiments of the invention, may be stored in the non-volatile memory 58 and/or volatile memory 56. In addition, CPU 54 may be connected to a user interface 62 and a network interface 64. The network interface 64 may be a wired or wireless interface and is connected to a network, represented by cloud 66. Thus the processing system 52 may be connected with seismic sensors, databases and other seismic sources and receivers of data through the network 66.

In use the processor 54 retrieves and executes the stored software components 60, for example from the non-volatile memory 58. During the execution of the software components 60 (that is when the computer system is performing the actions described above) the processor may store data temporarily in the volatile memory 56. The processor 54 may also receive data, through user interface 62 and network interface 64, as required to implement embodiments of the invention. In some embodiments, a retrieval system for retrieving data from the seismic sensors may be provided and connected to the computer system 50 via interface 64.

The computer system 50 may also be used to interpret any seismic survey data acquired by any seismic surveying methods as known in the art. Alternatively, the computer system may provide an output via either of the user interface 62 or the network interface 64 which can be used by other systems to perform the surveying methods.

FURTHER DETAILS OF EXEMPLARY EMBODIMENTS

In the above embodiments, the scaling factor a was taken to be constant. In a more general embodiment, the scaling factor may be assumed to change over time. If this is the case, a more general version of equation 1 is given by:

$$\tau_n - \tau_0 = \int_{t_0}^{t_n} a(t)dt \quad (19)$$

where a(t) is the value a represented as a function of time.

Regular samples of a may be taken to determine this function, with, for example, a(t) being interpolated between samples.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. For example, the above has been described in connection with seismic activities on land. However, the methodology is directly applicable to marine seismic surveys where the seismic sensors are located on or in the sea bed and where the seismic sources are located either on the sea bed or at or near the sea surface. The features of the claims may be combined in combinations other than those specified in the claims.

The invention claimed is:

1. A method comprising:
emitting, by a first seismic source, a first seismic signal, wherein the first seismic source is arranged collinearly with a first seismic sensor and a second seismic sensor, and wherein a direction of propagation of the first seismic signal extends from the first seismic sensor towards the second seismic sensor;
detecting, by the first seismic sensor, the first seismic signal;
detecting, by the second seismic sensor, the first seismic signal;
emitting, by a second seismic source, a second seismic signal, wherein the second seismic source is arranged collinearly with the first seismic sensor and the second seismic sensor, wherein a direction of propagation of the second seismic signal extends from the second seismic sensor towards the first seismic sensor, and wherein the direction of propagation of the first seismic signal opposes the direction of propagation of the second seismic signal;
detecting, by the first seismic sensor, the second seismic signal;
detecting, by the second seismic sensor, the second seismic signal;
identifying, relative to a first clock in the first seismic sensor, a first time associated with a time of arrival of the first seismic signal at the first seismic sensor, and a second time associated with a time of arrival of the second seismic signal at the first seismic sensor;
identifying, relative to a second clock in the second seismic sensor, a third time associated with a time of arrival of the first seismic signal at the second seismic sensor, and a fourth time associated with a time of arrival of the second seismic signal at the second seismic sensor; and
determining an offset of the first clock relative to the second clock using the first time, the second time, the third time, and the fourth time.

2. The method of claim 1, further comprising calculating an average of the first time and the second time and an average of the third time and the fourth time, wherein the offset is determined based on a difference between the average of the first time and the second time and the average of the third time and the fourth time.

3. The method of claim 1, wherein the outputs of the first seismic sensor and the second seismic sensor further include components corresponding to a detection of a third seismic signal and a fourth seismic signal, wherein a direction of propagation of the third seismic signal extends from the first seismic sensor towards the second seismic sensor, wherein a direction of propagation of the fourth seismic signal extends from the second seismic sensor towards the first seismic sensor, wherein the method further comprises:
identifying, relative to the first clock in the first seismic sensor, a fifth time associated with a time of arrival of the third seismic signal at the first seismic sensor, and a sixth time associated with a time of arrival of the fourth seismic signal at the first seismic sensor;
identifying, relative to the second clock in the second seismic sensor, a seventh time associated with a time of arrival of the third seismic signal at the second seismic sensor, and an eighth time associated with a time of arrival of the fourth seismic signal at the second seismic sensor; and
determining a scaling factor for the first clock using the first time, the second time, the third time, the fourth time, the fifth time, the sixth time, the seventh time, and the eighth time.

4. The method of claim 1, wherein the output of at least one of the first seismic sensor or the second seismic sensor further includes a component corresponding to a detection of a repeating seismic signal by the at least one of the first seismic sensor or the second seismic sensor, wherein the method further comprising:
identifying a period of the repeating signal in the output of the at least one of the first seismic sensor or the second seismic sensor; and
determining a scaling factor for the clock of the at least one of the first seismic sensor or the second seismic sensor using the identified period.

5. The method of claim 3, further comprising calibrating the clock of the at least one of the first seismic sensor or the second seismic sensor relative to a reference clock, using the offset and scaling factor.

6. The method of claim 1, wherein the data further includes an output of a third seismic sensor, wherein the third seismic sensor is located collinearly with the first seismic sensor and the second seismic sensor, and wherein the third seismic sensor has a third clock that is synchronised with the second clock, wherein the method further comprising:
identifying, relative to the third clock in the third seismic sensor, two further times associated with times of arrival of the first seismic signal and the second seismic signal at the third seismic sensor; and
determining an offset of the first clock relative to the second and third clocks using the first time, the second time, the third time, the fourth time, and the two further times.

7. The method of claim 6, comprising calculating an average of the first time and the second time and an average of the third time, the fourth time, the fifth time, and the sixth time, wherein the offset of the first clock relative to the second and third clocks is based on a difference of the average of the first time and the second time and the average of the third time, the fourth time, the fifth time, and the sixth time.

8. The method of claim 1, wherein the first seismic source is collocated with the first seismic sensor.

9. The method of claim 1, wherein the second seismic source is collocated with the second seismic sensor.

10. The method of claim 1, wherein the second seismic sensor is located between the first seismic source and the second seismic source.

11. A method of determining a scaling factor for a clock in a first seismic sensor, comprising:
detecting, by the first seismic sensor, a first seismic signal emitted by a first seismic source arranged collinearly with the first seismic sensor and a second seismic sensor, wherein a direction of propagation of the first seismic signal extends from the first seismic sensor towards the second seismic sensor;
detecting, by the first seismic sensor, a second seismic signal emitted by a second seismic source arranged collinearly with the first seismic sensor and the second seismic sensor, wherein a direction of propagation of the second seismic signal extends from the second seismic sensor towards the first seismic sensor, and wherein the direction of propagation of the first seismic signal opposes the direction of propagation of the second seismic signal;

identifying, relative to the clock in the first seismic sensor, time values corresponding to the first seismic signal and the second seismic signal;

determining, using the time values, a scaling factor for the time values of the clock by comparing the time values with a known period of the first seismic signal and the second seismic signal.

12. The method of claim 11, wherein the time values correspond to a given phase of the first seismic signal and the second seismic signal for a plurality of periods of the first seismic signal and the second seismic signal, and wherein the scaling factor is determined based on a difference of the time values.

13. The method of claim 11, further comprising:

identifying seismic signal values corresponding to the time values, wherein the seismic signal values are indicative of the first seismic signal and the second seismic signal; and calculating at least one inner product of the seismic signal values relative to a seismic signal of the known period, wherein the scaling factor is calculated based on the inner product.

14. The method of claim 11, wherein the periodic seismic signal comprises a plurality of discrete signals emitted at fixed intervals.

15. The method of claim 11, further comprising receiving a seismic data set recorded by at least one seismic sensor, and receiving offset data corresponding to an initial offset, OFF, between the clock in each seismic sensor and a system time, wherein initial offset and the scaling factor for the clock in each seismic sensor is used to correct the time measured by the clock.

16. The method of claim 15, wherein the scaling factor is used to correct the time measured by the clock by correcting a series of consecutive time intervals, wherein a first of the time intervals start at a time, $T_0$, wherein $T_0$ is the time measured by the clock at which the initial offset is known by calculating the scaling factor, a, for each time interval, according to the equation:

$$a = \frac{l_t}{l_\tau}$$

where $l_t$ represents the known periodic length of the first seismic signal and the second seismic signal and $l_\tau$ represents the periodic length of the measured signal.

17. The method of claim 15, wherein the scaling factor is used to correct the time measured by the clock according to the equation:

$$t_m = t_{pn} + A_{pn} \cdot (\tau_m - \tau_{pn})$$

wherein $t_m$ is the system time corresponding to a time $T_m$ measured by the clock, and wherein $A_{pn}$ is the scaling factor for the $n^{th}$ period, which is calculated according to the equation $$A_{pn} = \frac{l_t}{\tau_{p(n+1)} - \tau_{pn}}$$

wherein lt is periodicity of the plurality of discrete signals, wherein $T_{p(n+1)}$ is the time measured by the clock of the arrival at the first seismic sensor of the $(n+1)^{th}$ discrete signal, wherein $T_{pn}$ is the time measured by the clock of the arrival at the first seismic sensor of the $n^{th}$ discrete signal, wherein $t_{pn}$ is the system time corresponding to the arrival at the first seismic sensor of the discrete signal preceding $T_m$ and is calculated according to:

$$t_{pn} = t_{p1} + [(n-1) \cdot l_t]$$

wherein $t_{p1}$ is the system time corresponding to the arrival of the first discrete signal after the time at which the initial offset is known.

18. A method comprising:

detecting, by a first seismic sensor, the first seismic signal emitted by a first seismic source arranged collinearly with a first seismic sensor and a second seismic sensor, wherein a direction of propagation of the first seismic signal extends from the first seismic sensor towards the second seismic sensor;

detecting, by the second seismic sensor, the first seismic signal;

detecting, by the first seismic sensor, a second seismic signal by a second seismic source arranged collinearly with the first seismic sensor and the second seismic sensor, wherein a direction of propagation of the second seismic signal extends from the second seismic sensor towards the first seismic sensor, and wherein the direction of propagation of the first seismic signal opposes the direction of propagation of the second seismic signal;

detecting, by the second seismic sensor, the second seismic signal;

identifying, relative to a first clock in the first seismic sensor, a first time associated with a time of arrival of the first seismic signal at the first seismic sensor, and a second time associated with a time of arrival of the second seismic signal at the first seismic sensor;

identifying, relative to a second clock in the second seismic sensor, a third time associated with a time of arrival of the first seismic signal at the second seismic sensor, and a fourth time associated with a time of arrival of the second seismic signal at the second seismic sensor; and calculating an offset of the first clock relative to the second clock using the first time, the second time, the third time, and the fourth time.

* * * * *